United States Patent
Wakazono et al.

(10) Patent No.: US 9,423,321 B2
(45) Date of Patent: Aug. 23, 2016

(54) TIRE TESTING MACHINE

(71) Applicant: Kobe Steel, Ltd., Kobe-shi (JP)

(72) Inventors: Takehiko Wakazono, Takasago (JP); Masanobu Kurumaji, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 234 days.

(21) Appl. No.: 14/217,698

(22) Filed: Mar. 18, 2014

(65) Prior Publication Data

US 2014/0326061 A1 Nov. 6, 2014

(30) Foreign Application Priority Data

May 1, 2013 (JP) ................................ 2013-096415

(51) Int. Cl.
*G01M 17/02* (2006.01)
*G01M 1/16* (2006.01)
*G01M 1/22* (2006.01)
*G01M 1/02* (2006.01)
*G01M 1/32* (2006.01)

(52) U.S. Cl.
CPC ............ *G01M 17/02* (2013.01); *G01M 17/027* (2013.01); *G01M 1/02* (2013.01); *G01M 1/16* (2013.01); *G01M 1/225* (2013.01); *G01M 1/326* (2013.01)

(58) Field of Classification Search
CPC ......... G01M 1/02; G01M 1/326; G01M 1/16; G01M 1/225; G01M 17/027; G01B 11/24
USPC ................. 73/460, 146, 462; 33/203
See application file for complete search history.

(56) References Cited

U.S. PATENT DOCUMENTS

| | | | | | |
|---|---|---|---|---|---|
| 4,018,082 | A * | 4/1977 | Manoliu | ................ | G01N 29/26 73/600 |
| 4,290,205 | A * | 9/1981 | Holm | ...................... | G01M 1/02 33/203 |
| 5,104,593 | A * | 4/1992 | Joseph | ................ | B29C 47/0026 264/40.1 |
| 6,006,599 | A * | 12/1999 | Kelm-Klager | ...... | G01M 17/027 73/146 |
| 7,594,437 | B2 * | 9/2009 | Matteucci | ............. | G01M 1/326 73/457 |
| 8,553,213 | B2 * | 10/2013 | Fishel | ..................... | G01M 1/02 356/139.09 |
| 8,943,880 | B2 * | 2/2015 | Vignoli | ............... | B60C 25/0554 73/146 |
| 2007/0069571 | A1 * | 3/2007 | Matteucci | ............. | G01M 1/326 301/5.21 |
| 2009/0071236 | A1 * | 3/2009 | Kouyama | ............ | G01M 17/027 73/146 |
| 2010/0013913 | A1 * | 1/2010 | Vignoli | ............... | B60C 25/0554 348/61 |
| 2013/0008249 | A1 * | 1/2013 | Sotgiu | ................... | G01M 1/225 73/462 |

(Continued)

FOREIGN PATENT DOCUMENTS

| | | |
|---|---|---|
| CN | 1936530 A | 3/2007 |
| JP | 3216952 | 10/2001 |

*Primary Examiner* — Lisa Caputo
*Assistant Examiner* — Jonathan Dunlap
(74) *Attorney, Agent, or Firm* — Oblon, McClelland, Maier & Neustadt, L.L.P

(57) ABSTRACT

Provided is a tire testing machine including: a spindle shaft that rotatably attaches a tire as an inspection target thereto; a tire outer shape measurement sensor that moves close to the tire or moves away from the tire and detects a deformation amount of an outer shape and a diameter of the tire attached to the spindle shaft; and a collision preventing sensor that includes a probe formed in a linear material and a contact detecting portion detecting a state where the probe contacts the tire in order to prevent the tire outer shape measurement sensor from colliding with the tire, wherein the probe has a bent or divided shape in order to ensure a wider contact detecting range contacting the tire.

7 Claims, 4 Drawing Sheets

(56) References Cited

U.S. PATENT DOCUMENTS

2014/0311246 A1* 10/2014 Oda .................. G01B 17/02 73/627

2015/0013453 A1* 1/2015 Lawson ................ G01M 1/045 73/462

* cited by examiner

TIRE TESTING MACHINE

BACKGROUND OF THE INVENTION

1. Field of the Invention

The present invention relates to a tire testing machine that includes a collision preventing sensor used to prevent a collision between a tire outer shape measurement sensor and a tire.

2. Description of the Related Art

In a tire manufacturing line, a tire testing machine performs a tire test in which the uniformity (evenness) of a tire is measured. The measurement of the uniformity is performed in a manner such that a tire attached to a spindle shaft is pressed against a rotation drum, the spindle shaft or the rotation drum is rotationally driven, and a force variation occurring in the tire is measured as a uniformity waveform.

Further, in the tire testing machine, the diameter of the tire or the deformation amount (the uneven or undulated portion of the surface of the tire) in the radial direction and the lateral direction of the tire is also measured by a tire outer shape measurement sensor provided in the tire testing machine in addition to the measurement of the uniformity.

As a technique of detecting the deformation amount (the run-out) of the outer shape and the diameter of the tire attached to the spindle shaft, a technique of a tire testing machine disclosed in Japanese Patent No. 3216952 is known. The technique relates to a run-out device of a tire uniformity machine in which a slide frame that is movable in a reciprocating manner in the radial direction with respect to a subject inspection tire is equipped with sensors that detect the deformation amounts of both side wall portions, both shoulder portions, and a tread portion of the tire. Here, the run-out device of the tire uniformity machine includes a position adjustment unit that adjusts the positions of the sensors detecting the deformation amounts of both side wall portions in the tire axis direction, a position adjustment unit that adjusts the positions of the sensors detecting the deformation amounts of both shoulder portions and the tread portion in the tire axis direction, and a position adjustment unit that adjusts the positions of the sensors in the tire radial direction. That is, the slide frame that is movable in a reciprocating manner in the radial direction with respect to the tire is equipped with tire outer shape measurement sensors that respectively detect the deformation amounts of both side wall portions, both shoulder portions, and the tread portion of the tire.

The tire outer shape measurement sensor is adapted to be movable in a reciprocating manner with respect to the tire by the position adjustment units provided in the tire testing machine. Then, the position of the tire outer shape measurement sensor is adjusted in accordance with the size of the tire and the like. That is, in a case where the position of the tire outer shape measurement sensor is adjusted during the measurement of the outer shape of the tire, the position of the tire outer shape measurement sensor is determined by teaching for each tire in advance based on information on the diameter of the tire or the thickness of the tire.

However, there is a concern that the tire outer shape measurement sensor may collide with the tire due to the erroneous information on the diameter of the tire or the thickness of the tire input from an operator or the erroneous allocation of the tire input information for the conveyed tire. Further, there is a concern that the tire outer shape measurement sensor may collide with the tire due to the problem of a driving motor that extends an arm provided with the tire outer shape measurement sensor. Further, since the tire outer shape measurement sensor provided in the tire testing machine is very expensive, there is a need to prevent the damage caused by the collision with the tire.

In order to solve the above-described problems, the tire testing machine may be equipped with a collision preventing unit that detects a gap (a distance) between the tire outer shape measurement sensor and the tire and urgently stops the tire outer shape measurement sensor before the tire outer shape measurement sensor collides with the tire.

In the collision preventing unit, a contact detection type sensor (generally a limit switch) is used. Usually, the collision preventing sensor (the collision preventing unit) may be equipped with a bar-shaped probe, and the extension of the arm provided in the tire outer shape measurement sensor stops when the probe contacts the tire.

Incidentally, as illustrated in FIGS. 4A to 4C, a non-contact zone in which a bar-shaped probe 118 does not contact a tire T exists in each of the end portions (both shoulder portions) of a tire T attached to a rim 104 of a spindle shaft 102 in the width direction since the probe 118 moves along the outer peripheral surface of the tire T in a case where the probe 118 of a collision preventing sensor 117 of the related art is located at the outside (the upper and lower sides of the drawing paper of FIGS. 4A to 4C) in relation to the end portions of the tire T in the width direction. For this reason, a problem arises in that the probe 118 does not contact the tire T and a tire outer shape measurement sensor 116 contacts the tire T.

FIG. 4A is a view illustrating a case where the probe 118 extends in the horizontal direction with respect to the horizontal movement direction of the tire outer shape measurement sensor 116.

As illustrated in this drawing, when an arm portion 121 moves in the horizontal direction so that the probe 118 is located at the center portion of the tire T in the width direction, the contact of the probe 118 with respect to the tire T may be detected to a certain degree. However, when the probe 118 is located at the outside of the end portion of the tire T in the width direction, a non-contact zone in which the probe 118 does not contact the tire T exists. For this reason, there is a concern that the tire outer shape measurement sensor 116 may collide with the tire T.

FIG. 4B is a view illustrating a case where the probe 118 extends in the perpendicular direction with respect to the horizontal movement direction of the tire outer shape measurement sensor 116.

As illustrated in this drawing, when the arm portion 121 moves in the perpendicular direction so that the probe 118 is located at the center portion of the side wall portion of the tire T, the contact of the probe 118 with respect to the tire T may be detected to a certain degree. However, when the probe 118 is located at the outside (the outside of the outer peripheral surface of the tire T) in relation to the end portion of the tire T in the radial direction, a non-contact zone in which the probe 118 does not contact the tire T exists. For this reason, there is a concern that the tire outer shape measurement sensor 116 may collide with the tire T. Further, when the arm portion 121 moves in the horizontal direction so that the probe 118 is located at the center portion of the tread portion of the tire T, the contact of the probe 118 with respect to the tire T may not be detected since the probe 118 extends in the perpendicular direction.

FIG. 4C is a view illustrating a case where the probe 118 is disposed obliquely with respect to the horizontal movement direction of the tire outer shape measurement sensor 116 in order to solve the problems of FIGS. 4A and 4B. In this case, the contact of the tire T may be detected in a wide range with respect to the horizontal and perpendicular movements of the arm portion 121. However, even in this configuration, a non-contact zone in which the probe 118 does not contact the tire T exists. For this reason, there is a concern that the tire outer shape measurement sensor 116 may collide with the tire T.

For example, in the probe 118 that detects the lower surface of the side wall portion of the tire T, when the probe 118 moves in the horizontal direction and moves in the upward perpendicular direction so that the probe 118 approaches the surface (the side wall portion) of the tire T, the probe 118 enters the inner portion of the tire T (a non-contact zone in which the probe 118 does not contact the tire T occurs). For this reason, the tire outer shape measurement sensor 116 collides with the tire T (the example of the probe 118 that is located at the lower side of the tire T of FIG. 4C).

Further, even when the side wall portion of the tire T is bulged, the tire outer shape measurement sensor 116 collides with the bulged side wall portion before the probe 118 contacts the tire T (the example of the probe 118 located at the upper side of the tire T of FIG. 4C).

Therefore, the present invention is made in view of the above-described problems, and an object thereof is to provide a tire testing machine that includes a collision preventing sensor capable of reliably detecting a state where a gap between a tire outer shape measurement sensor and a tire becomes within a predetermined distance by eliminating a non-contact zone in which a probe of the collision preventing sensor does not contact the tire and of reliably preventing a collision between the tire outer shape measurement sensor and the tire.

SUMMARY OF THE INVENTION

In order to attain the above-described object, the present invention provides the following technical means.

According to the present invention, there is provided a tire testing machine including: a spindle shaft that rotatably attaches a tire as an inspection target thereto; a tire outer shape measurement sensor that moves close to the tire or moves away from the tire and detects a deformation amount of an outer shape and a diameter of the tire attached to the spindle shaft; and a collision preventing sensor that includes a probe formed in a linear material and a contact detecting portion detecting a state where the probe contacts the tire in order to prevent the tire outer shape measurement sensor from colliding with the tire, wherein the probe has a bent or divided shape.

In the above-described configuration, the collision preventing sensor may be disposed in the tire outer shape measurement sensor.

In the above-described configuration, the probe may have a shape in which the probe includes a base portion that protrudes from the contact detecting portion in the radial direction of the tire and a front end portion that is bent at a right angle with respect to the base portion and extends in the width direction of the tire.

In the above-described configuration, the probe may have a shape in which the probe includes a base portion that protrudes from the contact detecting portion in the radial direction of the tire, an intermediate portion that is bent at a right angle with respect to the base portion and extends in the width direction of the tire, and a front end portion that is bent at a right angle toward the contact detecting portion with respect to the intermediate portion and extends in the radial direction of the tire.

In the above-described configuration, the probe may have a shape in which the probe includes a base portion that protrudes from the contact detecting portion in the radial direction of the tire and front end portions that are divided from the front end portion of the base portion at a right angle in two directions in the width direction of the tire.

In the above-described configuration, the probe may have a shape in which the probe includes a base portion that protrudes from the contact detecting portion in the radial direction of the tire, intermediate portions that are divided from the front end portion of the base portion at a right angle in two directions in the width direction of the tire, and front end portions that are respectively bent at a right angle from two front end portions of the intermediate portions toward the contact detecting portion with respect to the intermediate portions and extend in the radial direction of the tire.

In the above-described configuration, the probe may be formed of an elastic metal material.

According to the tire testing machine of the present invention, since the collision preventing sensor includes the bent or divided probe, it is possible to reliably detect a state where the gap between the tire outer shape measurement sensor and the tire becomes within a predetermined distance by eliminating the non-contact zone in which the collision preventing sensor does not contact the tire, and hence to further reliably prevent the collision between the tire outer shape measurement sensor and the tire.

DESCRIPTION OF THE PREFERRED EMBODIMENTS

Figure 1:
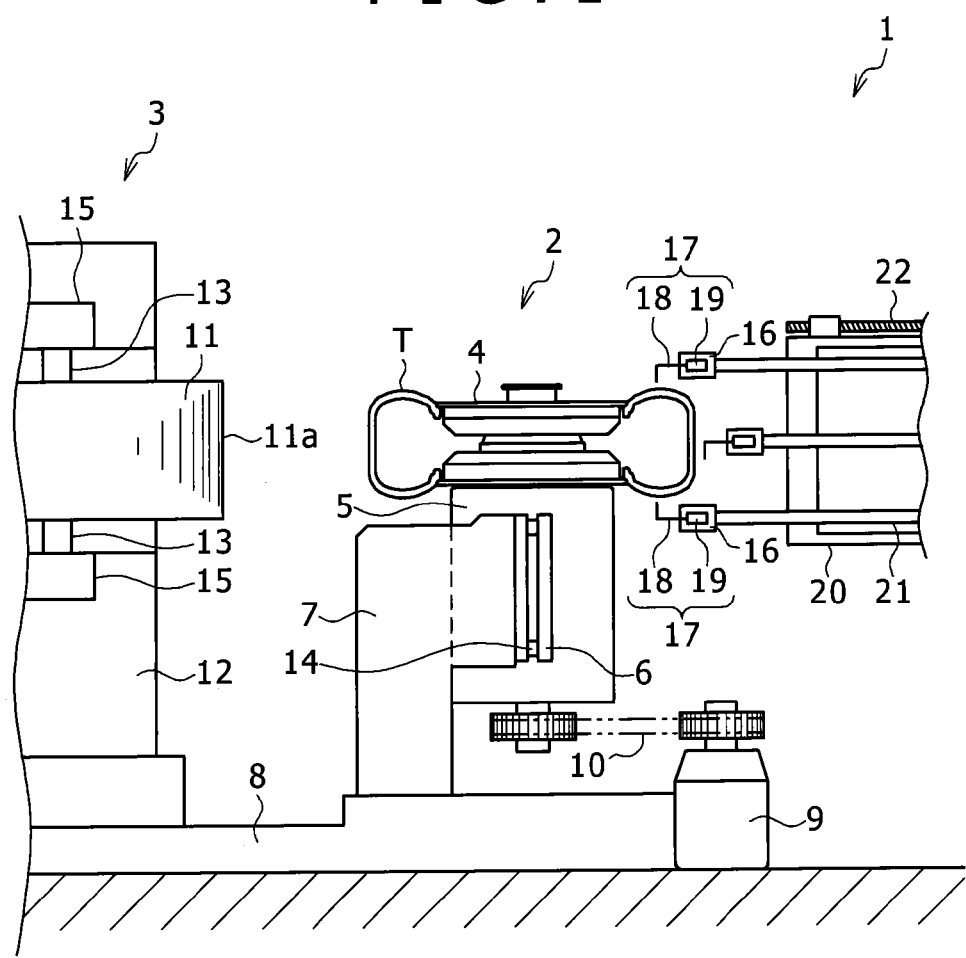
FIG. 1 is a schematic view illustrating a tire testing machine according to the present invention.

A tire testing machine 1 according to the present invention will be described in detail by referring to the drawings.

As illustrated in FIG. 1, the tire testing machine 1 that is exemplified in the present specification is a complex testing machine that measures the uniformity of a tire T (the evenness of the tire T) as an inspection target and the dynamic balance (the dynamic balancing) of the tire T. Further, the tire testing machine 1 of the present invention also measures the diameter of the tire T or the deformation amount of the outer shape of the tire T (the run-out: the uneven or undulated portion of the surface of the tire T) while measuring the uniformity and the dynamic balance of the tire T.

The present invention is characterized in that it provides a technique relating to the measurement of the deformation amount of the outer shape of the tire T, and the employed tire testing machine 1 is not limited to the complex testing machine. That is, the tire testing machine may be a uniformity measurement tire testing machine or a dynamic balance measurement tire testing machine.

Hereinafter, in the description of the tire testing machine 1 according to the present invention, the right and left direction of the drawing paper of FIG. 1 is set as the horizontal (right and left) direction when the tire testing machine 1 is described. Further, the up and down direction of the drawing paper of FIG. 1 is set as the perpendicular (vertical) direction when the tire testing machine 1 is described.

As illustrated in FIG. 1, the tire testing machine 1 includes a spindle shaft 2 that attaches the tire T as the inspection target thereto so that the tire is rotatable about the shaft center in the perpendicular direction and rotationally drives the tire T attached thereto, a rotation drum mechanism 3 that is disposed with a predetermined gap from the spindle shaft 2 and is movable close to and away from the tire T attached to the spindle shaft 2, a uniformity measuring unit 15 that measures the uniformity of the tire T contacting the rotation drum mechanism 3, and a dynamic balance measuring unit 14 that measures the dynamic balance of the tire T away from the rotation drum mechanism 3.

In addition, the tire testing machine 1 includes a tire outer shape measurement sensor 16 that moves close to the tire T or moves away from the tire T and detects the diameter of the tire T attached to the spindle shaft 2 and the deformation amount of the outer shape thereof and a collision preventing sensor 17 that includes a probe 18 and a contact detecting portion 19 detecting a state where the probe 18 contacts the tire T and stops the movement of the tire outer shape measurement sensor 16 when the probe 18 contacts the tire T so as to prevent the tire outer shape measurement sensor 16 from colliding with the tire T.

Hereinafter, the tire testing machine 1 according to the present invention will be described in detail. First, the spindle shaft 2 that is provided in the tire testing machine 1 is formed in a cylindrical shape about a shaft center facing the perpendicular direction and is rotatably supported by a spindle housing 5. A pair of upper and lower rims 4 that fixes the tire T is provided in the upward protruding portion of the spindle shaft 2.

The spindle housing 5 is formed in a cylindrical shape so as to accommodate the spindle shaft 2 therein, and rotatably supports the spindle shaft 2. A housing support member 6 that fixes the spindle housing 5 to a base 8 is disposed in the outer peripheral surface of the spindle housing 5, and the housing support member 6 is formed in a plate shape that extends in both the perpendicular direction and the horizontal direction.

The spindle shaft 2 is rotated by the rotational driving force transmitted from a motor 9 thereto through a timing belt 10. The rotation drum mechanism 3 which is movable close to and away from the spindle shaft 2 is provided at the lateral side thereof so as to be separated from the spindle shaft 2 by a predetermined gap.

The rotation drum mechanism 3 includes a drum portion 11 that has a cylindrical outer shape and includes a simulation road surface 11a formed in a cylindrical outer peripheral surface thereof so that the tire T contacts the simulation road surface 11a and a drum support body 12 that rotatably supports the drum portion 11.

The drum portion 11 is provided at a position facing the rims 4 of the spindle shaft 2, and is rotatable about a shaft portion (a shaft center) 13 that protrudes upward and downward.

The drum support body 12 supports the drum portion 11 so that the drum portion 11 is driven and rotated about the shaft center in the perpendicular direction and is movable close to and away from the tire T in the horizontal direction, and hence the drum portion 11 is adapted so that the simulation road surface 11a may contact the tire T attached to the spindle shaft 2.

In the tire testing machine 1 exemplified in FIG. 1, the uniformity measuring unit 15 that measures the uniformity of the tire T is provided between the rotation drum mechanism 3 and the drum support body 12. In addition, the dynamic balance measuring unit 14 that is configured as a load cell is provided between a positioning member 7 and the housing support member 6 of the spindle housing 5.

Further, the tire testing machine 1 is equipped with the tire outer shape measurement sensor 16 that detects the diameter of the tire T and the deformation amount of the outer shape thereof. The tire outer shape measurement sensor 16 is disposed at a position facing the rotation drum mechanism 3 with the spindle shaft 2 interposed therebetween.

The tire outer shape measurement sensor 16 moves close to the tire T or moves away from the tire T and detects the diameter of the tire T attached to the spindle shaft 2 and the deformation amount of the outer shape thereof (the uneven or undulated portion of the surface of the tire T). As the deformation amount of the outer shape of the tire T, for example, the magnitude of the radial run-out (RR) of the tire T or the magnitude of the lateral run-out (LR) of the tire T may be exemplified.

The tire outer shape measurement sensor 16 is used to measure the deformation amount of the outer shape of the tire T at the positions of the center line and both shoulders of the tire T, and performs the measurement at a position where the sensor is not influenced by the deformation of the tire T in the vicinity of the ground contact position in the event of a load.

The tire outer shape measurement sensor 16 is a non-contact sensor and is, for example, an optical cutting sensor that emits a line beam and measures the outer shape of the tire T based on the reflected beam. The tire outer shape measurement sensor 16 is attached to an arm portion 21 that is provided in a slide frame 20 adapted to be movable in a reciprocating manner in the horizontal direction. The tire outer shape measurement sensor 16 that detects the deformation amounts of both side wall portions of the tire T is provided as a pair of upper and lower tire outer shape measurement sensors provided so as to be separated from both side wall portions of the tire T by a predetermined gap. The tire outer shape measurement sensor 16 that detects the deformation amounts of both shoulder portions and the tread portion of the tire T is provided so as to be separated from both shoulder portions and the tread portion of the tire T.

The slide frame 20 is a plate-shaped frame, and is movable in a reciprocating manner in the horizontal direction. Further, a driving device 22 such as an adjustment screw that moves the slide frame 20 in a reciprocating manner in the horizontal direction is attached to the slide frame 20.

The tire testing machine 1 is equipped with a first position adjustment unit that adjusts the position of the tire outer shape measurement sensor 16, which detects the deformation amounts of both side wall portions of the tire T, in the direction of the rotation shaft of the tire T and a second position adjustment unit that adjusts the position of the tire outer shape measurement sensor 16, which detects the deformation amounts of both shoulder portions and the tread portion of the tire T, in the axial direction of the tire T (where both position adjustment units are not illustrated).

The position of the tire outer shape measurement sensor 16 during the measurement of the deformation amount of the tire T is defined in advance by teaching for each tire T based on the information on the diameter of the tire T and the thickness of the tire T of the inspection target.

Further, the collision preventing sensor 17 is disposed in the tire outer shape measurement sensor 16.

The collision preventing sensor 17 includes the probe 18 and the contact detecting portion 19 that detects a state where the probe 18 contacts the tire T. The collision preventing sensor 17 is used to prevent the tire outer shape measurement sensor 16 from colliding with the tire T by stopping the extension of the arm portion 21 provided in the tire outer shape measurement sensor 16 when the probe 18 existing at the front side of the tire outer shape measurement sensor 16 in the horizontal direction contacts the tire T during the forward movement of the slide frame 20 toward the tire T.

The contact detecting portion 19 detects a state where the gap between the tire outer shape measurement sensor 16 and the tire T is within a predetermined distance by the contact between the probe 18 and the tire T. A limit switch is used as the contact detecting portion 19, and for example, various multi-pole limit switches may be exemplified. Furthermore, the contact detecting portion 19 may be configured as any unit as long as the unit is operated by detecting the contact between the probe 18 and the tire T.

The probe 18 is formed in a shape in which the probe protrudes from the contact detecting portion 19 of the collision preventing sensor 17 and is bent and divided. When the probe 18 is bent and divided, it is possible to ensure a wide contact detection range between the collision preventing sensor 17 and the tire T, and hence to prevent the collision preventing sensor 17 from colliding with the tire T in advance.

The probe 18 is formed as a linear elastic metal material (for example, a wire). For that reason, the probe 18 may be easily bent, and hence may be easily changed in accordance with the actual shape of the tire T.

Hereinafter, a specific example of the shape of the probe 18 of the collision preventing sensor 17 provided in the tire testing machine 1 according to the present invention will be described by referring to the drawings.

FIGS. 2A to 3B illustrate examples of the shape of the probe 18 of the collision preventing sensor 17 provided in the tire testing machine 1 according to the present invention. Furthermore, in FIGS. 2A to 3B, the right and left direction of the drawing paper is set as the horizontal direction of the probe 18 and the tire testing machine 1, and the up and down direction of the drawing paper is set as the perpendicular direction of the probe 18 and the tire testing machine 1.

Figure 2A:
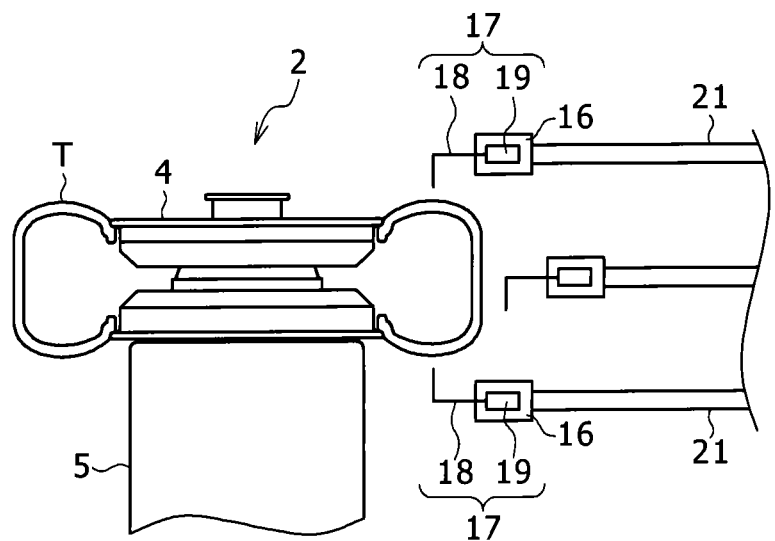
FIGS. 2A and 2B are schematic views illustrating a shape of a probe of a collision preventing sensor of the tire testing machine of the present invention.

The probe 18 illustrated in FIG. 2A is formed in a shape in which the probe protrudes from the contact detecting portion 19 of the collision preventing sensor 17 in the radial direction (the horizontal direction) of the tire T and is bent at a right angle in the width direction (the perpendicular direction) of the tire T. That is, the probe 18 is formed in a shape in which the probe includes a base portion that protrudes from the contact detecting portion 19 in the radial direction of the tire T and a front end portion that is bent at a right angle with respect to the base portion and extends in the width direction of the tire T.

For example, the probe 18 for detecting the upper surface of the side wall of the tire T is formed in a shape in which the probe protrudes from the contact detecting portion 19 toward the spindle shaft 2 in the radial direction of the tire T and the halfway portion of the probe 18 is bent at a right angle in the downward perpendicular direction (in the direction toward the side wall of the tire T). Further, the probe 18 for detecting the lower surface of the side wall of the tire T is formed in a shape in which the probe protrudes from the contact detecting portion 19 toward the spindle shaft 2 in the radial direction of the tire T and the halfway portion of the probe 18 is bent at a right angle in the upward perpendicular direction.

Meanwhile, the probe 18 for detecting the tread surface of the tire T is formed in a shape in which the probe protrudes from the contact detecting portion 19 toward the spindle shaft 2 and the halfway portion of the probe 18 is bent at a right angle in the upward or downward perpendicular direction. Here, the probe 18 for detecting the tread surface of the tire T is formed in a shape in which the halfway portion of the probe 18 is bent downward at a right angle when the movement start position of the collision preventing sensor 17 approaches the tire T from the upside thereof, and is formed in a shape in which the halfway portion of the probe 18 is bent upward at a right angle when the movement start position of the collision preventing sensor 17 approaches the tire T from the downside thereof.

Figure 2B:
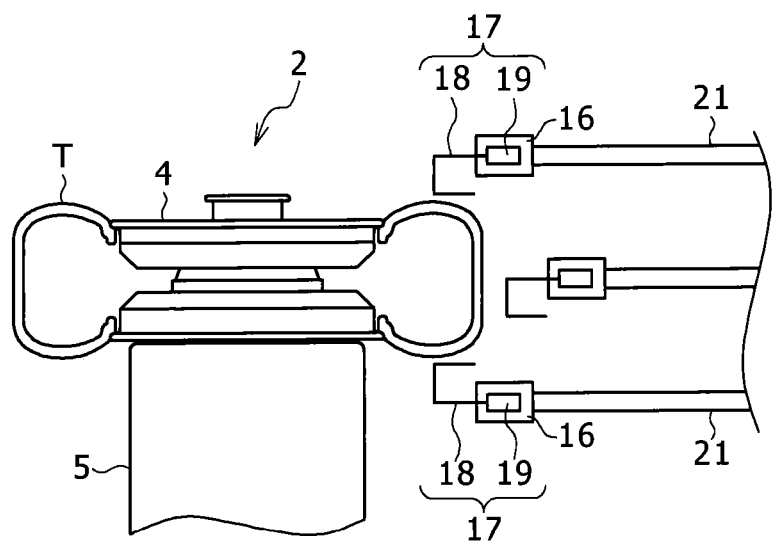

The probe 18 illustrated in FIG. 2B is formed in a shape in which the probe protrudes from the contact detecting portion 19 of the collision preventing sensor 17 in the radial direction of the tire T, is bent at a right angle in the width direction of the tire T, and is bent at a right angle in the radial direction of the tire T. That is, the probe 18 is formed in a shape in which the probe includes a base portion that protrudes from the contact detecting portion 19 in the radial direction of the tire T, an intermediate portion that is bent at a right angle with respect to the base portion and extends in the width direction of the tire T, and a front end portion that is bent at a right angle toward the contact detecting portion 19 with respect to the intermediate portion and extends in the radial direction of the tire T.

For example, the probe 18 for detecting the upper surface of the side wall of the tire T is formed in a shape in which the probe protrudes from the contact detecting portion 19 toward the spindle shaft 2 in the radial direction of the tire T, the halfway portion of the probe 18 is bent at a right angle in the downward perpendicular direction (the direction of the side wall of the tire T), and the front end portion of the probe 18 follows the radial direction of the tire T so as to be separated from the spindle shaft 2. Further, the probe 18 for detecting the lower surface of the side wall of the tire T is formed in a shape in which the probe protrudes from the contact detecting portion 19 toward the spindle shaft 2 in the radial direction of the tire T, the halfway portion of the probe 18 is bent at a right angle in the upward perpendicular direction, and the front end portion of the probe 18 follows the radial direction of the tire T so as to be separated from the spindle shaft 2.

Meanwhile, the probe 18 for detecting the tread surface of the tire T is formed in a shape in which the probe protrudes from the contact detecting portion 19 toward the spindle shaft 2, the halfway portion of the probe 18 is bent at a right angle in the upward or downward perpendicular direction, and the front end portion of the probe 18 is separated from the spindle shaft 2. Here, the probe 18 for detecting the tread surface of the tire T is formed in a shape in which the halfway portion of the probe 18 is bent downward at a right angle and the front end portion of the probe 18 is separated from the spindle shaft 2 when the movement start position of the collision preventing sensor 17 approaches the tire T from the upside thereof, and is formed in a shape in which the halfway portion of the probe 18 is bent upward at a right angle and the front end portion of the probe 18 is separated from the spindle shaft 2 when the movement start position of the collision preventing sensor 17 approaches the tire T from the downside thereof.

Figure 3A:
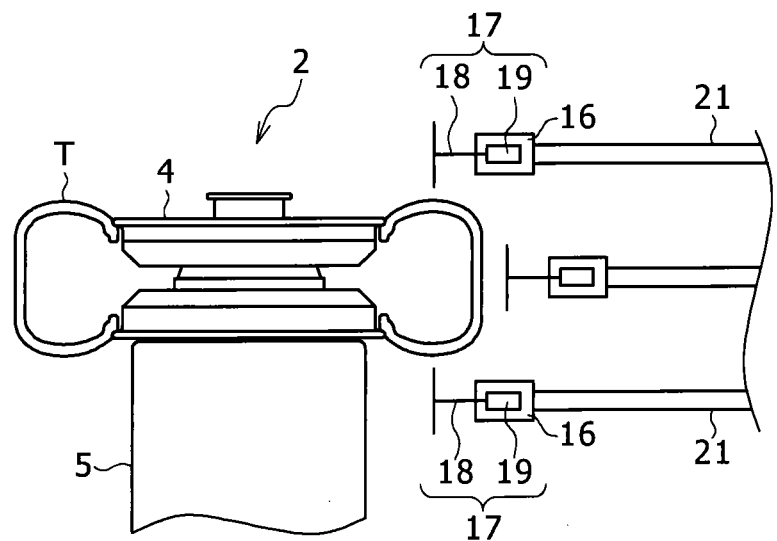
FIGS. 3A and 3B are schematic views illustrating a shape of a probe of a collision preventing sensor of the tire testing machine of the present invention.

The probe 18 illustrated in FIG. 3A is formed in a shape in which the probe protrudes from the contact detecting portion 19 of the collision preventing sensor 17 in the radial direction of the tire T and is divided at a right angle in two directions in the width direction of the tire T. That is, the probe 18 is formed in a shape in which the probe includes a base portion that protrudes from the contact detecting portion 19 in the radial direction of the tire T and front end portions that are divided from the front end portion of the base portion at a right angle in two directions in the width direction of the tire T.

For example, the probes 18 for detecting the upper and lower surfaces of the side wall of the tire T are formed in a shape in which the probes protrude from the contact detecting portion 19 toward the spindle shaft 2 in the radial direction of the tire T and the halfway portions of the probes 18 are bent at a right angle in a direction toward the side wall of the tire T and a direction separated from the side wall of the tire T.

Meanwhile, the probe 18 for detecting the tread surface of the tire T is formed in a shape in which the probe protrudes from the contact detecting portion 19 toward the spindle shaft 2 and the halfway portion of the probe 18 is bent at a right angle in the upward and downward perpendicular directions.

Figure 3B:
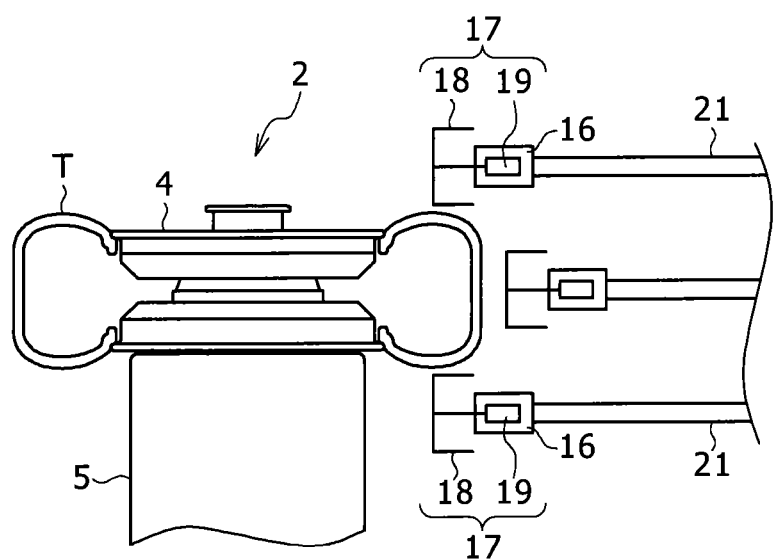
Figure 4A:
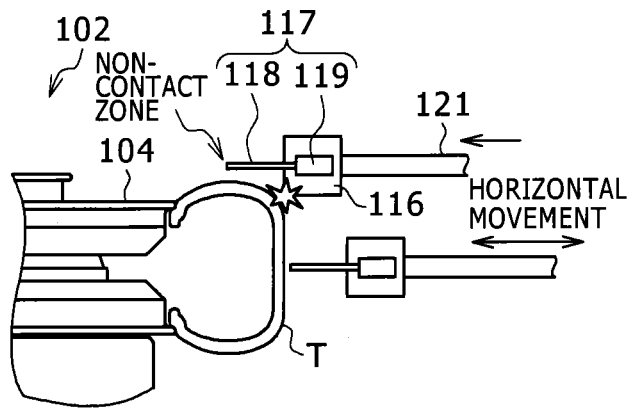
FIGS. 4A to 4C are views illustrating a problem of a collision preventing sensor of a tire testing machine of the related art.
Figure 4B:
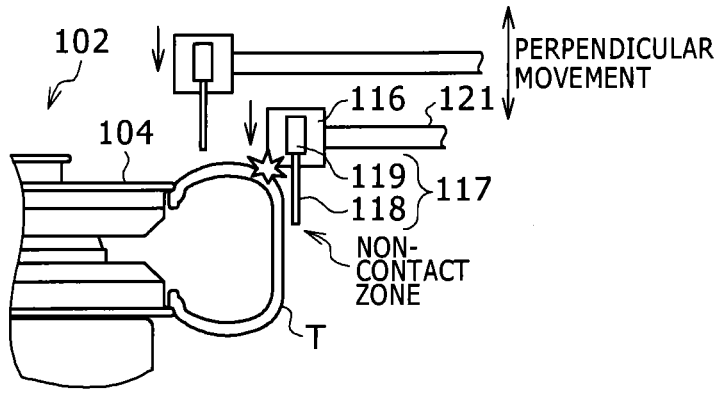
Figure 4C:
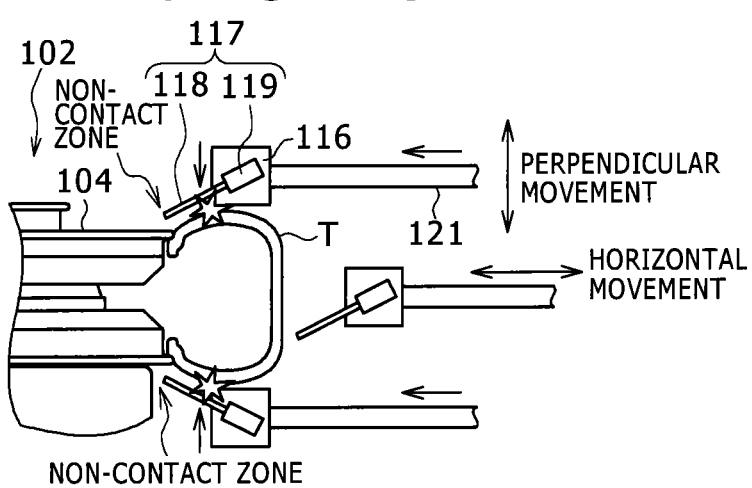

The probe 18 illustrated in FIG. 3B is formed in a shape in which the probe protrudes from the contact detecting portion 19 of the collision preventing sensor 17 in the radial direction of the tire T, is divided at a right angle in two directions in the width direction of the tire T, and is bent at a right angle in the radial direction of the tire T. That is, the probe 18 is formed in a shape in which the probe includes a base portion that protrudes from the contact detecting portion 19 in the radial direction of the tire T, intermediate portions that are divided from the front end portion of the base portion at a right angle in two directions in the width direction of the tire T, and front end portions that are respectively bent at a right angle from two front end portions of the intermediate portions toward the contact detecting portion 19 with respect to the intermediate portions and extend in the radial direction of the tire T.

For example, the probes 18 for detecting the upper and lower surfaces of the side wall of the tire T are formed in a shape in which the probes protrude from the contact detecting portion 19 toward the spindle shaft 2 in the radial direction of the tire T, the halfway portions of the probes 18 are bent at a right angle in a direction toward the side wall of the tire T and a direction separated from the side wall of the tire T, and the front end portions of the probes 18 are formed so as to be separated from the spindle shaft 2.

Meanwhile, the probe 18 for detecting the tread surface of the tire T is formed in a shape in which the probe protrudes from the contact detecting portion 19 toward the spindle shaft 2, the halfway portion of the probe 18 is bent at a right angle in the upward and downward perpendicular directions, and the front end portion of the probe 18 is separated from the spindle shaft 2.

As described above, since the probe 18 of the collision preventing sensor 17 provided in the tire testing machine 1 of the present invention has a bent or divided shape, it is possible to reliably detect a state where the gap between the tire outer shape measurement sensor 16 and the tire T becomes within a predetermined distance (the contact between the probe 18 and the tire T) by eliminating a non-contact zone in which the collision preventing sensor 17 does not contact the tire T. Therefore, it is possible to prevent the tire outer shape measurement sensor 16 from colliding with the tire T. Further, when the probe 18 of the present invention is formed in the shape illustrated in FIG. 2B, the non-contact zone in the perpendicular movement direction may be reduced. In addition, when the probe 18 of the present invention is formed in the shape illustrated in FIG. 3A or 3B, the non-contact zone may be further reduced.

Further, if the probe 18 of the present invention is formed of a linear elastic metal material, a force generated by the contact with the tire T is not applied to the arm portion 21 supporting the collision preventing sensor 17 (the tire outer shape measurement sensor 16) and the tire T when the probe 18 of the collision preventing sensor 17 contacts the tire T. Accordingly, the surface of the tire T may be kept in a good condition and the damage of the arm portion 21 may be also prevented.

The present invention is not limited to the above-described embodiments, and the shapes, the structures, the materials, and the combinations of the constituents may be appropriately modified without departing from the spirit of the present invention.

In particular, various shapes capable of reducing the non-contact zone may be considered other than the case where the probe 18 is formed in the shapes of FIGS. 2A to 3B. For example, the bent portion may be bent at a degree of accuracy other than the right angle. Further, the linear bent shape is not limited, and the bent shape may be formed in a circular-arc shape. The combination of the linear shapes is not limited, and a partially curved shape may be also included therein.

What is claimed is:

1. A tire testing machine comprising:
a spindle shaft that rotatably attaches a tire as an inspection target thereto;
a tire outer shape measurement sensor that moves close to the tire or moves away from the tire and detects a deformation amount of an outer shape and a diameter of the tire attached to the spindle shaft; and
a collision preventing sensor that includes a probe formed in a linear material and a contact detecting portion detecting a state where the probe contacts the tire in order to prevent the tire outer shape measurement sensor from colliding with the tire,
wherein the probe has a bent or divided shape.

2. The tire testing machine according to claim 1,
wherein the probe has a shape in which the probe includes a base portion that protrudes from the contact detecting portion in the radial direction of the tire and a front end portion that is bent at a right angle with respect to the base portion and extends in the width direction of the tire.

3. The tire testing machine according to claim 1,
wherein the probe has a shape in which the probe includes a base portion that protrudes from the contact detecting portion in the radial direction of the tire, an intermediate portion that is bent at a right angle with respect to the base portion and extends in the width direction of the tire, and a front end portion that is bent at a right angle toward the contact detecting portion with respect to the intermediate portion and extends in the radial direction of the tire.

4. The tire testing machine according to claim 1,
wherein the probe has a shape in which the probe includes a base portion that protrudes from the contact detecting portion in the radial direction of the tire and front end portions that are divided from the front end portion of the base portion at a right angle in two directions in the width direction of the tire.

5. The tire testing machine according to claim 1,
wherein the probe is formed of an elastic metal material.

6. A tire testing machine comprising:
a spindle shaft that rotatably attaches a tire as an inspection target thereto;
a tire outer shape measurement sensor that moves close to the tire or moves away from the tire and detects a deformation amount of an outer shape and a diameter of the tire attached to the spindle shaft; and
a collision preventing sensor that includes a probe formed in a linear material and a contact detecting portion detecting a state where the probe contacts the tire in order to prevent the tire outer shape measurement sensor from colliding with the tire,
wherein the probe has a bent or divided shape,
wherein the collision preventing sensor is disposed in the tire outer shape measurement sensor.

7. A tire testing machine comprising:

a spindle shaft that rotatably attaches a tire as an inspection target thereto;

a tire outer shape measurement sensor that moves close to the tire or moves away from the tire and detects a deformation amount of an outer shape and a diameter of the tire attached to the spindle shaft; and a collision preventing sensor that includes a probe formed in a linear material and a contact detecting portion detecting a state where the probe contacts the tire in order to prevent the tire outer shape measurement sensor from colliding with the tire, wherein the probe has a bent or divided shape, wherein the probe has a shape in which the probe includes a base portion that protrudes from the contact detecting portion in the radial direction of the tire, intermediate portions that are divided from the front end portion of the base portion at a right angle in two directions in the width direction of the tire, and front end portions that are respectively bent at a right angle from two front end portions of the intermediate portions toward the contact detecting portion with respect to the intermediate portions and extend in the radial direction of the tire.

* * * * *